United States Patent
Chapman

[19]

[11] Patent Number: 5,820,088
[45] Date of Patent: Oct. 13, 1998

[54] CAMERA PEDESTAL DRIVE COLUMN

[75] Inventor: Leonard T. Chapman, North Hollywood, Calif.

[73] Assignee: Chapman/Leonard Studio Equipment, Inc., North Hollywood, Calif.

[21] Appl. No.: 643,272

[22] Filed: May 3, 1996

Related U.S. Application Data

[63] Continuation of Ser. No. 188,137, Jan. 26, 1994, Pat. No. 5,516,070, which is a continuation-in-part of Ser. No. 761,179, Sep. 16, 1991, Pat. No. 5,318,313, which is a continuation-in-part of Ser. No. 591,525, Oct. 1, 1990, Pat. No. 5,197,700.

[51] Int. Cl.$^6$ .................................................. F16M 11/26
[52] U.S. Cl. .................... 248/161; 248/188.5; 248/404
[58] Field of Search ................ 248/161, 162.1, 248/404, 405, 157, 188.5; 254/2 R, 93 R

[56] References Cited

U.S. PATENT DOCUMENTS

| | | |
|---|---|---|
| 160,290 | 3/1875 | Trenchard .............................. 248/404 |
| 2,638,075 | 5/1953 | Towler . |
| 3,277,547 | 10/1966 | Muller et al. . |
| 3,322,393 | 5/1967 | Neilson et al. . |
| 3,329,403 | 7/1967 | Juds . |
| 3,521,341 | 7/1970 | Hornlein et al. .................... 248/161 X |
| 3,622,124 | 11/1971 | Sidles et al. . |
| 4,003,584 | 1/1977 | Zelli . |
| 4,094,484 | 6/1978 | Galione . |
| 4,111,389 | 9/1978 | Gundlach et al. . |
| 4,183,689 | 1/1980 | Wirges et al. ...................... 248/161 X |
| 4,300,782 | 11/1981 | Pioth . |
| 4,337,845 | 7/1982 | Zelli et al. . |
| 4,360,187 | 11/1982 | Chapman . |
| 4,577,827 | 3/1986 | Eliscu . |
| 4,627,591 | 12/1986 | Heckmann ....................... 248/188.5 X |
| 4,657,267 | 4/1987 | Jaumann et al. . |
| 4,697,773 | 10/1987 | Jaumann et al. . |
| 4,867,416 | 9/1989 | Garrett et al. . |
| 4,950,126 | 8/1990 | Fabiano et al. . |
| 5,028,037 | 7/1991 | Wang . |
| 5,052,645 | 10/1991 | Hixon .............................. 248/188.5 X |
| 5,114,109 | 5/1992 | Fitz et al. ........................... 248/161 X |
| 5,174,593 | 12/1992 | Chapman . |
| 5,197,700 | 3/1993 | Chapman . |
| 5,318,313 | 6/1994 | Chapman . |

FOREIGN PATENT DOCUMENTS

| | | | |
|---|---|---|---|
| 376414 | 7/1990 | European Pat. Off. ............ 248/188.5 |
| 753997 | 10/1933 | France . |
| 426360 | 3/1926 | Germany ............................... 248/161 |
| 1529723 | 1/1970 | Germany ............................... 248/404 |
| 3739471 A1 | 6/1989 | Germany . |
| 3824563 | 2/1990 | Germany . |
| WO9002888 | 3/1990 | WIPO . |

OTHER PUBLICATIONS

International Search Report from PCT/US94/08272.
FGV Panther Column Brochure.
Cricket Camera Dolly Brochure.
Vinten Complete Range Catalogue 1989/90 —selected pages.
Ladybird Elemack Brochure.
Vinten Tri–Track photographs.

*Primary Examiner*—Leslie A. Braun
*Assistant Examiner*—Derek J. Berger
*Attorney, Agent, or Firm*—Lyon & Lyon LLP

[57] ABSTRACT

A camera pedestal has a cylinder with a tapering cross-section for providing a uniform counterbalancing force using a compressed gas. Telescoping column sections which make up a column assembly have inner relief channels and outer slots for hardened roller strips. A column drive system has a hydraulic actuator to remotely raise the column assembly, and to lock the column assembly into any selected position. The column assembly is eccentrically positioned on its base tank. The pedestal is engageable to a receptacle on a camera dolly with a telescoping steering drive tube interconnecting a steering assembly on the pedestal with a steering system in the dolly.

5 Claims, 11 Drawing Sheets

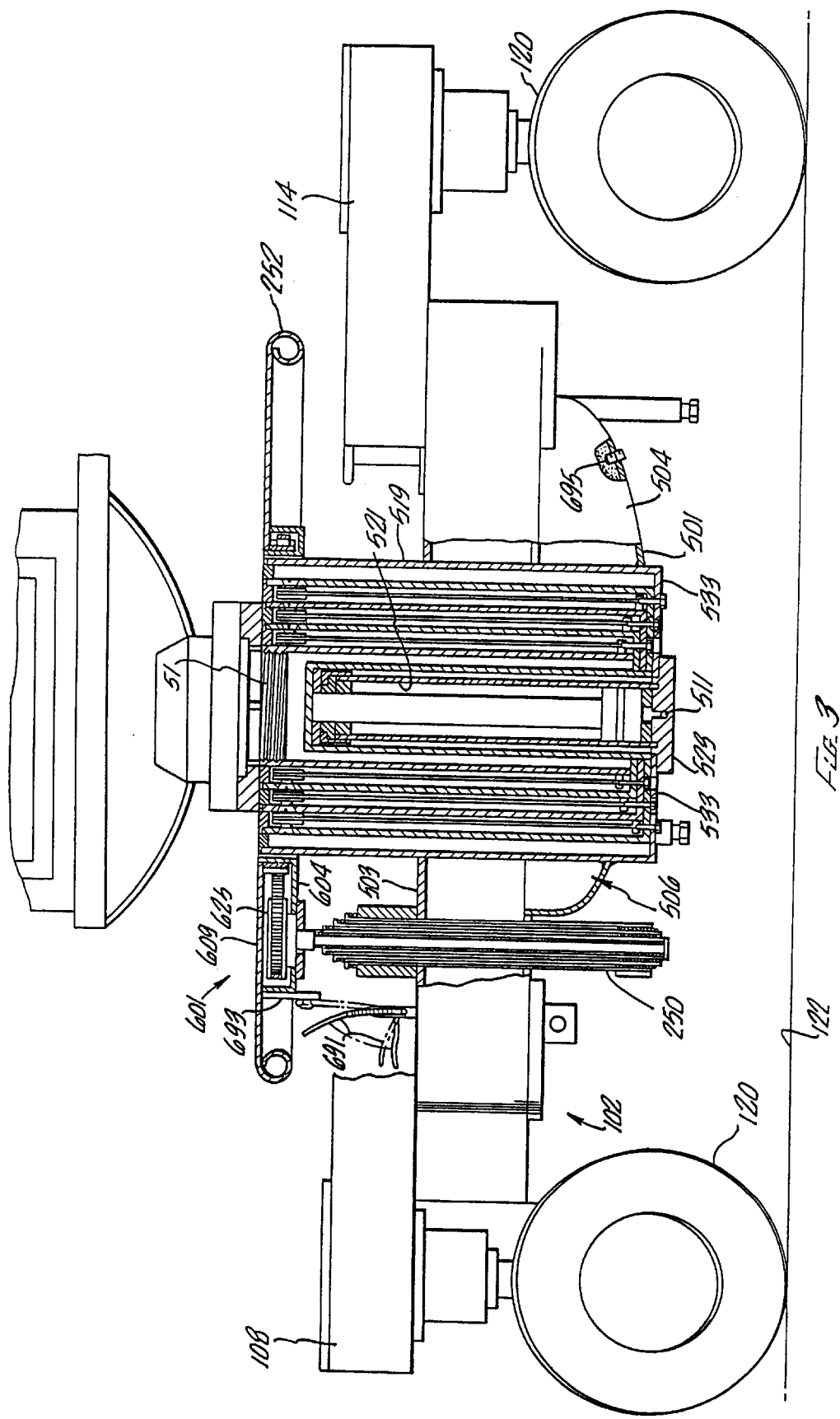

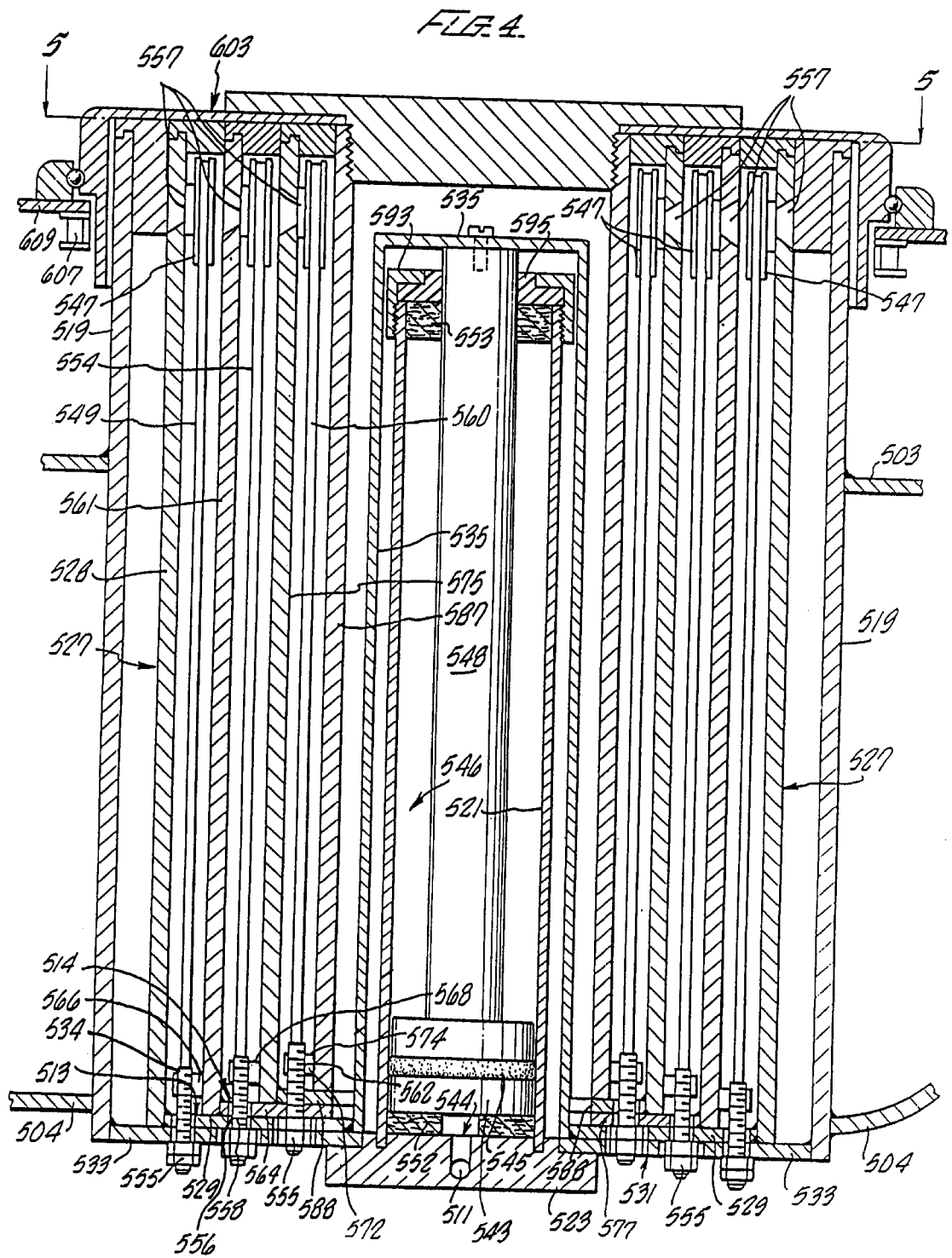

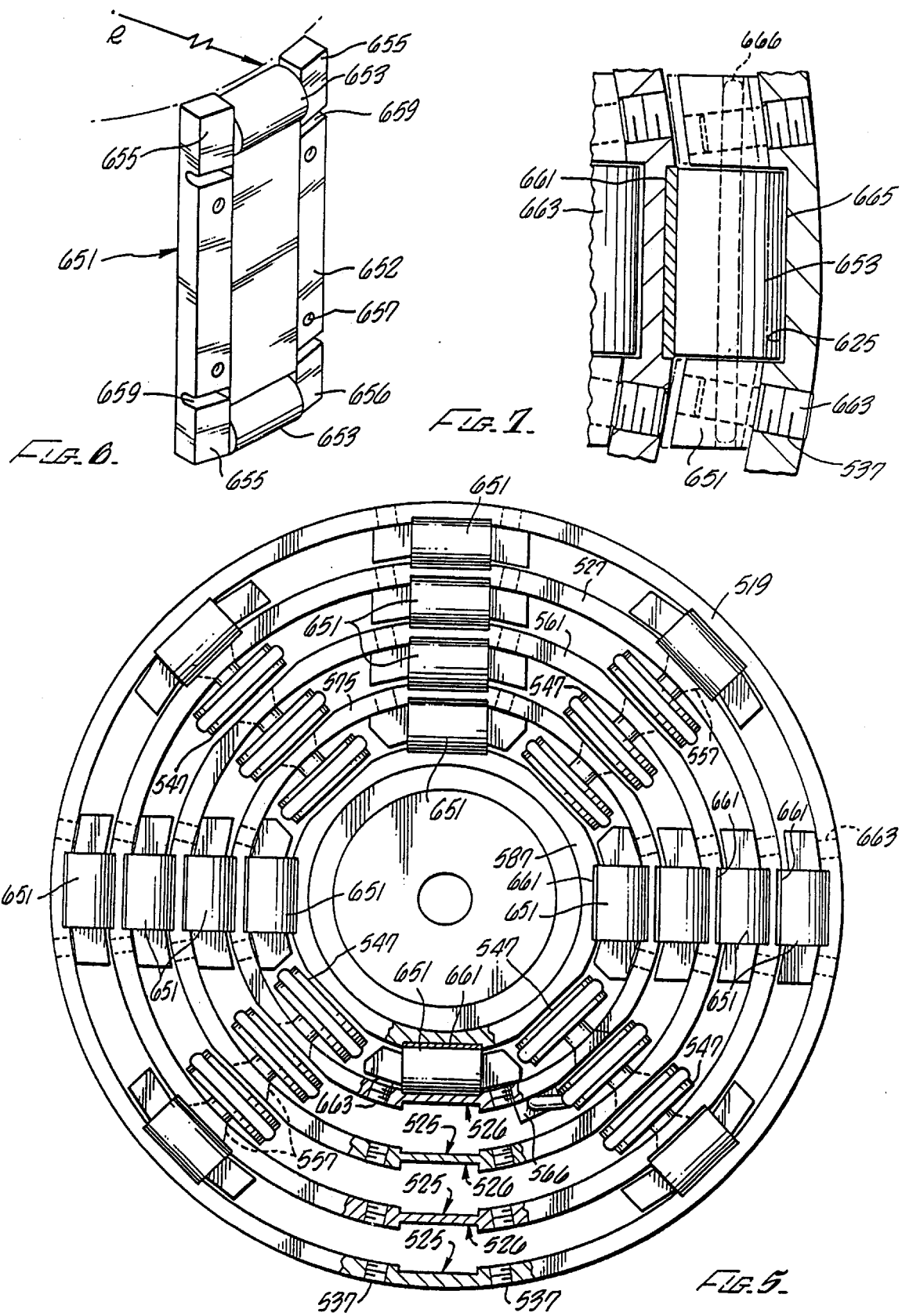

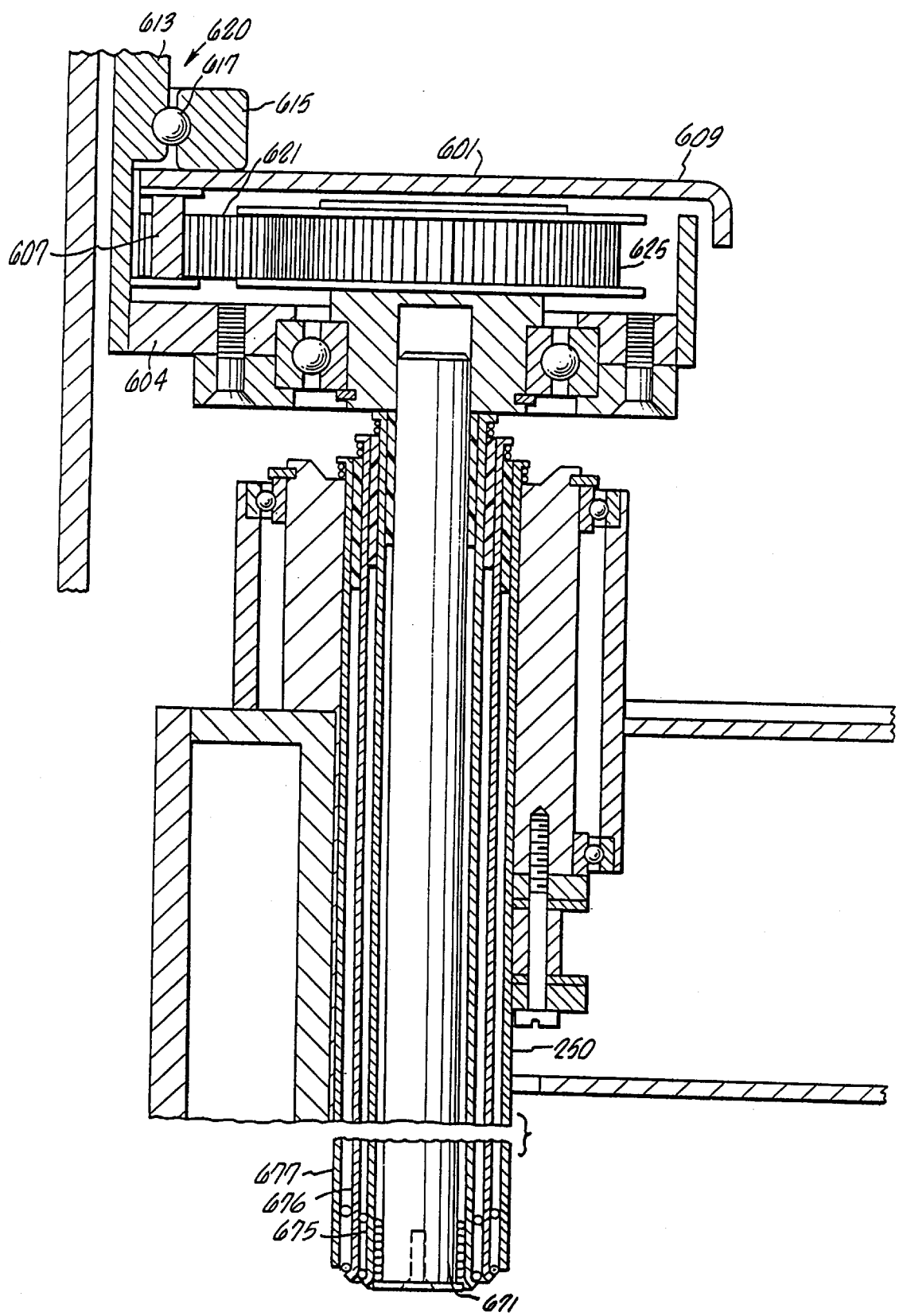

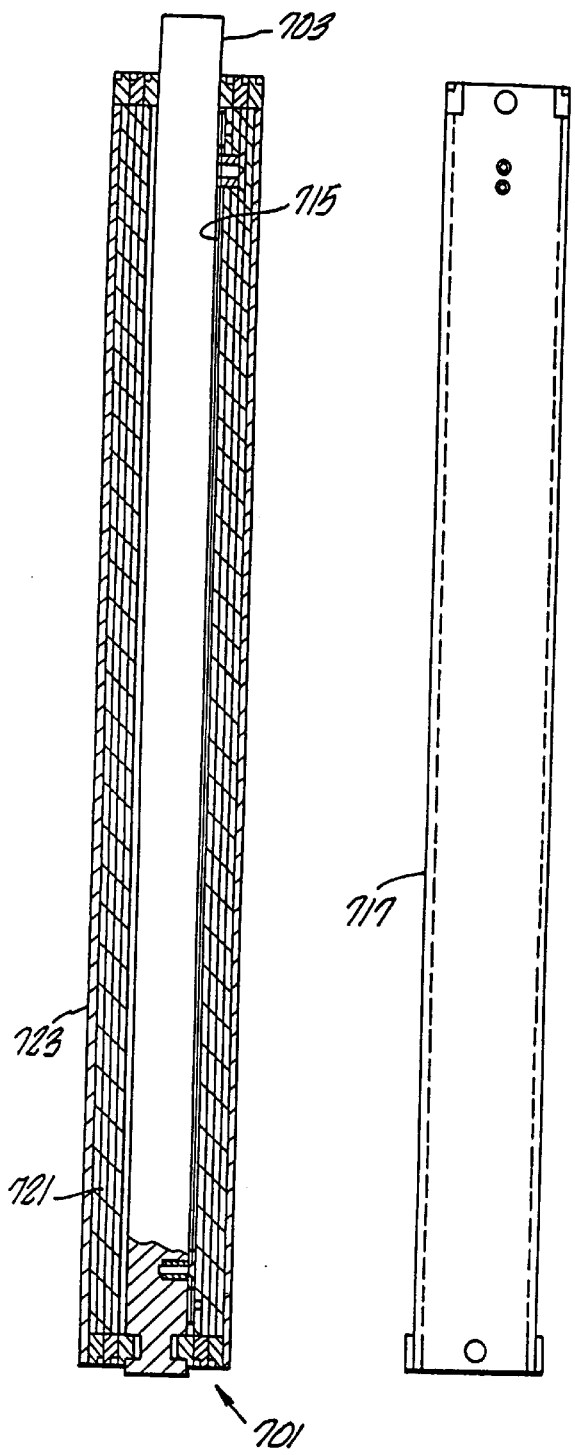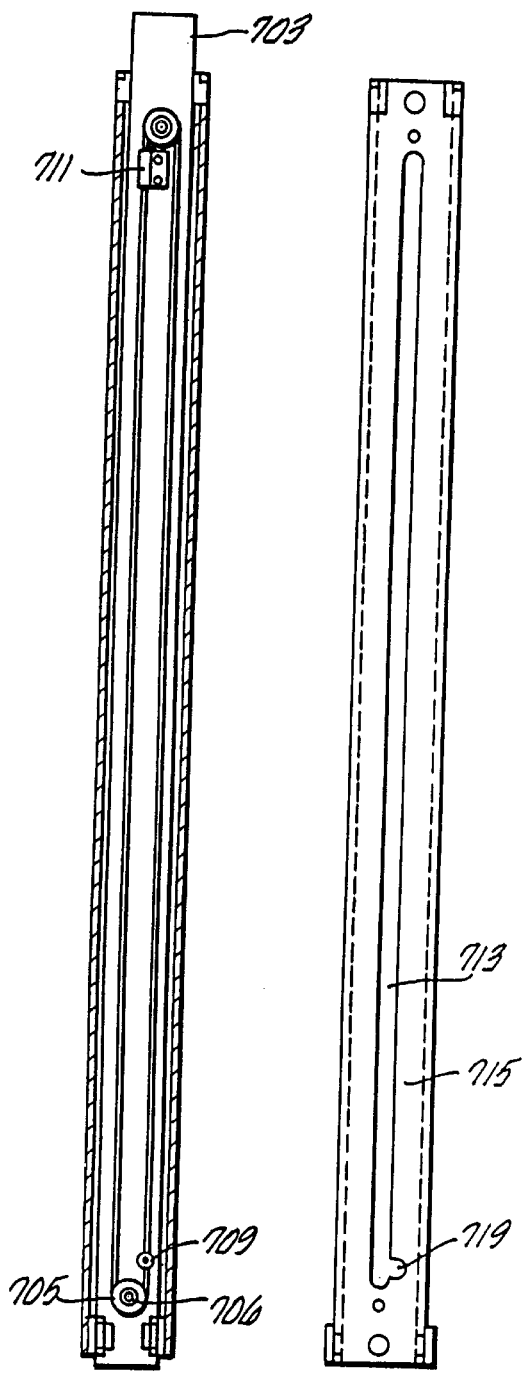
FIG. 12.  FIG. 13.  FIG. 14.  FIG. 15.

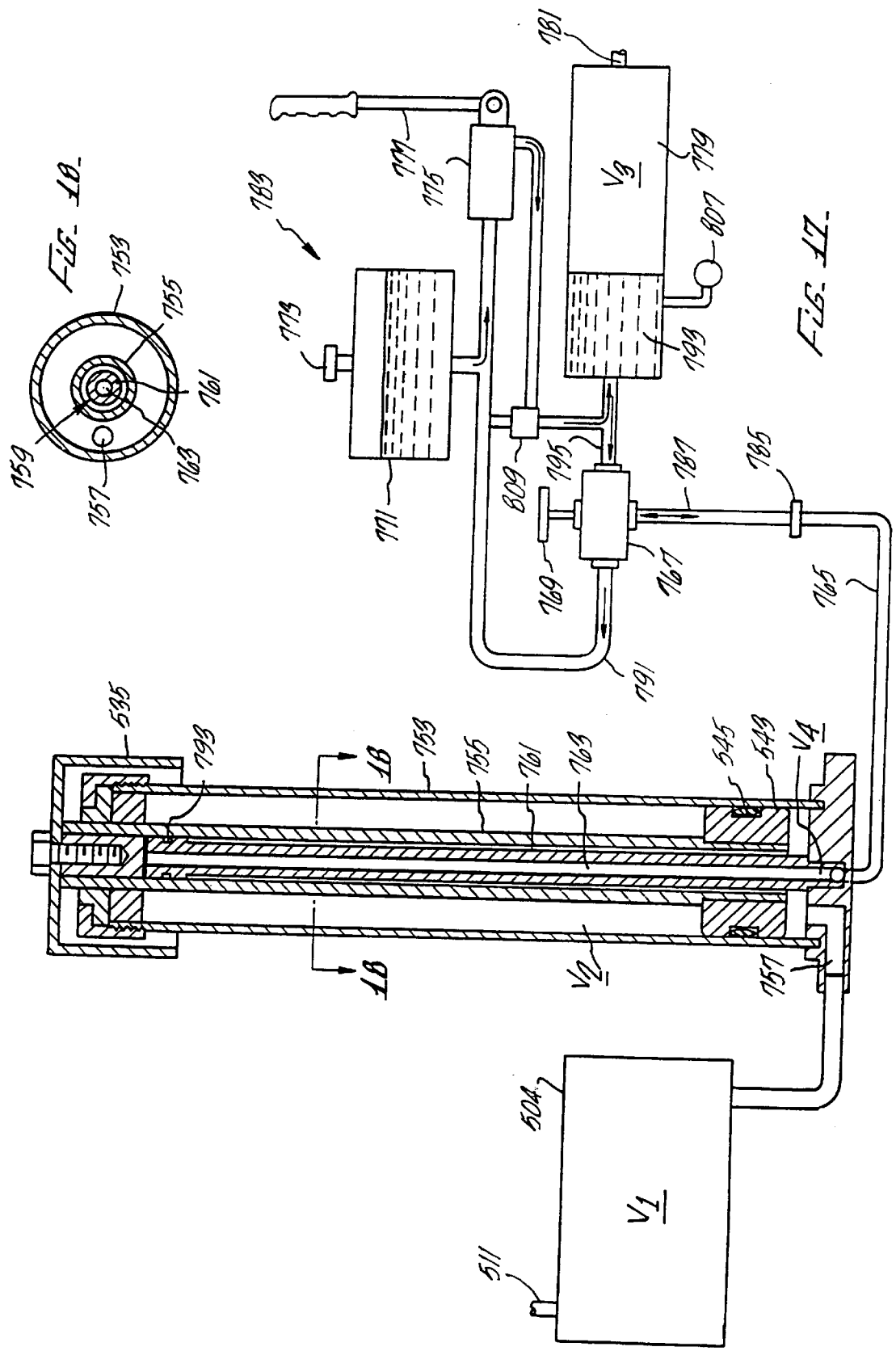

CAMERA PEDESTAL DRIVE COLUMN

CROSS REFERENCE TO RELATED APPLICATION

This application is a Continuation of Ser. No. 188,137, filed Jan. 26, 1994, now U.S. Pat. No. 5,516,070, which is a Continuation-in-Part of Ser. No. 761,179, filed Sep. 16, 1991, now U.S. Pat. No. 5,318,313, which in turn is a Continuation-in-Part of application Ser. No. 591,525, filed Oct. 1, 1990, now U.S. Pat. No. 5,197,700, each incorporated herein by reference. The disclosure of U.S. Pat. No. 5,318,313 and No. 5,174,593 are also incorporated herein by reference.

BACKGROUND OF THE INVENTION

The field of the invention is telescoping columns.

Video, television, and motion picture cameras must often be positioned in a particular way for a video or film sequence. The camera must also often move or sweep in azimuth or elevation, and the entire camera may need to be translated or moved over the ground surface, e.g., to follow an action sequence or obtain a desired cinematographic effect. The camera may also have to be elevated or lowered at certain times.

Generally, all movement of the camera must be uniform and smooth without any bumping, rocking, tilting, vibration or other movement that will cause the recorded images to jump when viewed on a screen. For film sequences where the camera remains stationary, a simple support, e.g., a tripod may be sufficient. When the camera must be moved while operating, more sophisticated camera supports are required.

Ideally, the camera support should be lightweight and easily portable; capable of handling a wide range of loads; and support or move the camera with an absolute minimum of noise, vibration, rocking, tilting, jarring, etc. Depending on its specific application, the camera support may also need to be compact so that it may be used in cramped spaces.

Mobile and stationary camera pedestals are commonly used in television productions. These pedestals allow the camera to be raised and lowered and turned or swept (in azimuth). A tilt or elevation feature may also be included. These mobile units generally have three sets of paired wheels forming a three point support.

Within the pedestal, a mechanism for smoothly and quietly raising and lowering the camera platform is required. A purely manual system is generally insufficient since the weight of the camera may be substantial and the combination of inertia, friction and the application of the lifting or dropping force by hand will not ordinarily provide the necessary smooth, quiet and accurate positioning. Consequently, counterbalancing or compensation systems have been provided in camera pedestals to compensate for the weight of the camera and facilitate cinematographically acceptable changes in camera height or elevation. While known camera pedestals may have met with varying degrees of technical or commercial success, various disadvantages remain. For example, no known camera pedestal has a compressed gas compensation system which provides a uniform counterbalancing force throughout the full extension of the pedestal column. In addition, mechanical or spring actuated counterbalancing or compensation systems in pedestals are relatively complex and may be noisy in operation and difficult to set for a particular camera weight. These known pedestals also typically generate perceptible noise, especially during quick movements. In addition, they ordinarily have a limited range of movement or may tend to drift or sink from a desired position.

It is advantageous in filming or shooting to be able to position the camera to a very low position. This requires relatively short column sections in telescoping type pedestals. On the other hand, to also have a sufficient maximum height, a relatively large number of column sections is required, heretofore making for a bulky pedestal.

Generally, camera pedestals are raised and lowered by hand. This requires that the "grip" or pedestal operator be on or next to the camera pedestal to change the elevation of the camera. Moreover, obtaining a smooth change in elevation during a filming sequence depends on the skills and steady hand of the pedestal operator.

Accordingly, it is an object of the invention to provide an improved camera pedestal which has uniform camera weight compensation throughout the full extension of the pedestal.

It is a further object of the invention to provide such a camera pedestal which is configured for ease of use and is compact yet offers exceptionally low camera positions while still having a large elevation range.

It is a further object of the invention to provide a camera pedestal having a column drive and brake. Other and further objects and advantages will appear hereinafter.

SUMMARY OF THE INVENTION

To these ends, an adjustable camera pedestal preferably includes a column with a hollow tapered drive cylinder having a round cross section area which uniformly expands from the bottom of the cylinder to the top of the cylinder. A piston slidably displaceable within the cylinder advantageously has a seal which seals the piston against the inner drive cylinder walls throughout the entire stroke of the piston. A first column section is attached to the piston. A tank with a volume $V_t$ is fillable with a pressurized gas, e.g., compressed nitrogen, and is connected to the drive cylinder which has a volume $V_c$. Where the lower end of the cylinder has a circular cross-section area $A_1$; the upper end of the cylinder has a cross-section $A_2$; the initial gas pressure is $P_i$ and the final gas pressure is $P_f$, the relationship of the areas, volumes, and pressure is $$P_i A_1 = \frac{P_f V_t A_2}{V_t + V_c}.$$

With this relationship, the compensating force acting on the piston remains constant through the stroke of the piston in the drive cylinder. This occurs because even though the gas pressure within the tank and cylinder drops slightly as the piston moves up in the cylinder due to an increase in volume, the area on the piston face on which the gas pressure exerts force increases by a corresponding amount. Consequently, whether the pedestal is near the top or bottom of its range of positions, the compensating force remains the same. This prevents the camera mounted on the pedestal from "drifting" up or down due to an inexact compensating force, i.e., the camera will remain as it has been vertically positioned. Preferably, the seal between the piston and cylinder is an expandable seal secured about the piston with the ability to prevent extrusion into the linearly increasing circular gap caused by the taper.

A column drive includes a hydraulic system preferably provided as an accessory attached to the pedestal. The hydraulic system exerts hydraulic pressure on the piston to raise the column. The hydraulic system can be compact and lightweight as it need only overcome friction and inertial forces, and not payload weight which is compensated for by the compressed gas also acting on the piston.

BRIEF DESCRIPTION OF THE DRAWINGS

Other objects and features of the present invention will become apparent from the following detailed description taken in connection with the accompanying drawings. It is to be understood, however, that the drawings are designed for the purpose of illustration only and are not intended as definition of the limits of the invention.

In the drawings, wherein similar reference characters denote similar elements throughout the several views:

FIG. 3 is a side elevation view in part section of the pedestal as mounted in a dolly;

FIG. 4 is a side view fragment in part section of the column assembly of the pedestal;

FIG. 5 is a top view in part section of the column assembly with the structural shields removed;

FIG. 6 is a perspective view of a roller block shown in FIG. 5;

FIG. 7 is an enlarged section view fragment of the roller blocks shown in FIG. 5;

FIG. 9 is an enlarged section view fragment of the pedestal steering assembly;

FIG. 12 is a side elevation view of a second embodiment of the telescoping steering drive tube assembly of FIGS. 8 and 9;

FIG. 13 is a side elevation view of a second tube of the assembly of FIG. 12;

FIG. 14 is a side elevation view of the inner shaft thereof;

FIG. 15 is a side elevation view of a first tube of the assembly of FIG. 12;

FIG. 17 is a schematic illustration of the present column drive system;

FIG. 18 is a partial section view taken along line 18—18 of FIG. 17;

DETAILED DESCRIPTION OF THE DRAWINGS

Figure 1:
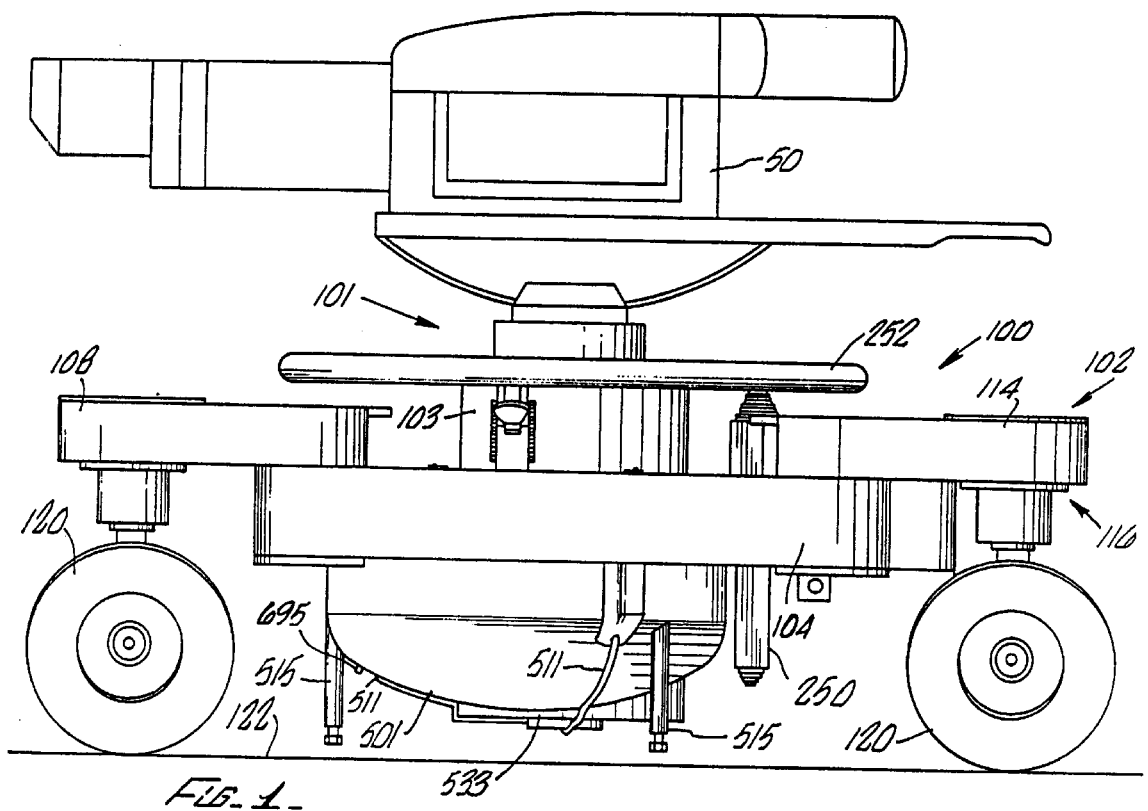
FIG. 1 is a side elevation view of the present camera pedestal installed in a camera dolly.

As shown in FIG. 1, a video, television, or motion picture camera 50 is mounted on top of a pedestal 101 having a steering wheel 252, telescoping steering drive tube 250 and a column assembly 103. The pedestal 101 is mounted on a dolly 102 having a chassis 104 with four articulating legs including left side legs 108 and 114. Wheels 120 are attached to the legs and roll on the floor or ground surface 122 or on track rails.

Figure 2:
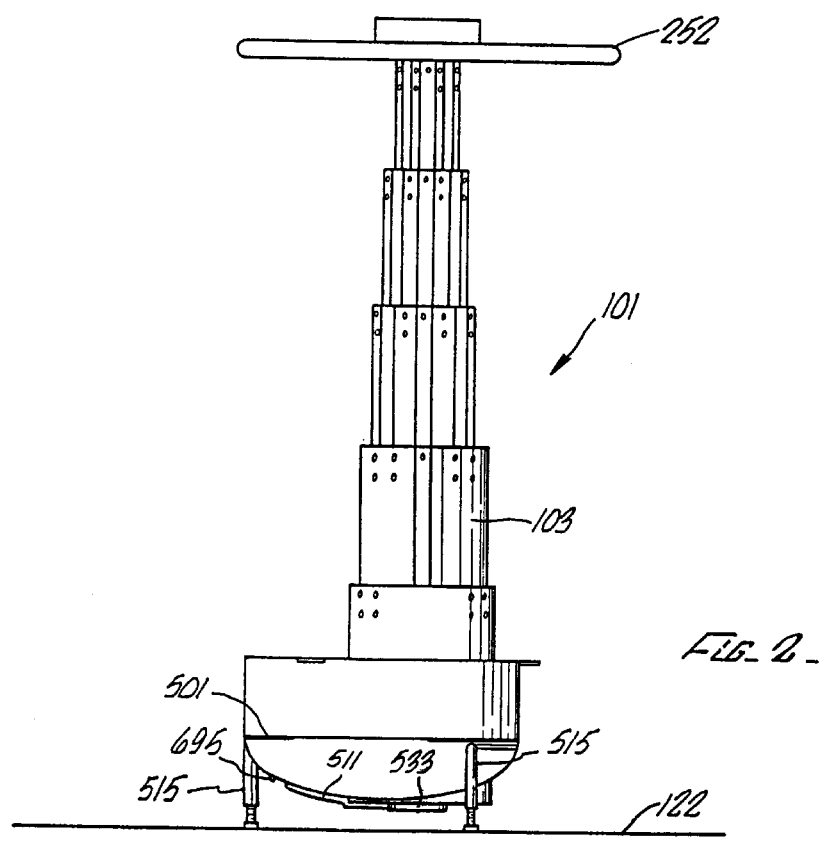
FIG. 2 is a perspective view of the pedestal.

As shown in FIG. 2, the pedestal 101 can be removed from the dolly 102 and stand on its own three legs 515, which are threadably adjustable in length. The pedestal can raise and lower the camera 50. A separate turret placed on top of the pedestal provides panning and tilting movements. When the pedestal 101 is used as shown in FIG. 2, the steering drive tube 250 is disconnected and remains with the dolly 102.

Referring to FIGS. 3 and 4, the pedestal 101 is provided with a camera mounting plate 51. A pedestal tank weldment 501 has a flat tank deck 503 and a generally hemispherical tank body 504. A column support 519 is generally cylindrical and has a circular plate column support base 533. The column support 519 is welded to the tank deck 503 and tank body 504 and is an integral part of the tank weldment 501 which forms a gas-pressure-tight container.

As shown in FIG. 4, centrally located within the column support 519 is a drive cylinder 521 having an bottom end cap 523. The drive cylinder 521 has a round cross section which uniformly tapers outwardly from the lower end of the cylinder 521 to the upper end thereof. In a preferred embodiment, the drive cylinder 521 is approximately 12 inches long with a base diameter of 2.250 inches linearly increasing to a diameter of 2.292 inches at its top. This increase in the drive cylinder bore or diameter compensates for decreasing gas pressure as the pedestal is elevated, as described further below. The drive cylinder tapered diameter can be increased for additional load carrying capacity. The amount of taper can be selected for corresponding tank volumes.

A piston 543 having a seal 545 is axially slidable or displaceable within the drive cylinder 521. A gas lead tube 511 connects the tank volume 506 to the drive chamber 544 below the piston 543. The ambient chamber 546 above the piston 543 in the drive cylinder 521 is vented to the outside environment. The seal 545 is preferably an U-ring Parker No. 8506-0187. This "U"-ring has good ability to compensate for the changing bore diameter, and the sealing forces are less, thus reducing friction. The "U"-ring size can be varied somewhat by selecting appropriate groove dimensions. The U-ring maintains a seal between the piston 543 and the drive cylinder 521 along the entire stroke through the drive cylinder 521, e.g., the seal 545 seals against both a 2.2500 bore and a 2.292 bore. Felt or other soft shock absorbing material end stops 552 and 553 are provided at each end of the cylinder bore 521 to quiet and cushion the movement of the piston 543 at the lower and upper ends of the drive cylinder 521. FIG. 4 shows the piston 543 at its bottom position resting against the lower felt end stop 552. Only the tank 506, lead tube 511, and the variable volume drive chamber 544 (which are all interconnected) contain pressurized gas.

A first column section 527 has a core cylinder 535 secured to the top of a drive rod 548 attached to the piston 543. The outer walls 528 of the first column section 527 are joined to the core cylinder 535 by an annular first column section base 529. The first column section base 529 may be welded to the tubular outer walls 528 and core cylinder. The bottom surface of the first column section base 529 rests within the fixed column support 519 when the column assembly 500 is in the down or collapsed condition. A second column section 561 has an integral base 577 and is nested concentrically within the first column section 527. Similarly, a third column section 575 having an integral third column section base 588 is nested within the second column section 561, and a fourth or top column section 587 (without a base) is nested within the third column section 575. In a preferred embodiment, the column support 519 is 10.0 inches in diameter and the first, second, third and fourth or final column sections are respectively 8.50, 7.00, 5.50 and 4.00 inches in diameter. However, it should be noted that although their sizes are described in terms of a diameter, the first through fourth column sections are somewhat octagonal, rather than purely round, as shown in FIG. 5.

A cylinder end cap 593 is threaded onto the upper end of the drive cylinder 521. A bushing 595 held in place by the cylinder end cap 593 slidably supports the drive rod 548. A steering frame assembly 603 is rigidly attached to the final column section 587 only. The steering frame assembly 603 is not connected to the other sections although it may rest on top of the ends of the other column sections with the column in the collapsed or down position as shown in FIG. 4.

Referring to FIGS. 4 and 5, pulleys 547 are attached to the inside surfaces of the first, second and third column sections 528, 561 and 575 by flathead pulley mounting bolts 557. The pulley mounting bolts 557 have countersunk heads and engage threaded bearing centers within the pulleys 547. A first section cable 549 has a cable stud 534 extending through clearance holes 513 in the first column section base 529 and in the column support base 533 and is secured by lock nuts 555. The first column section cable 549 passes over the pulley 547 attached near the top of the first column section 528 and terminates in a block 566 attached to the outer surface of the lower end of the second column section 561.

Similarly, a second column section cable 554 has an end stud 556 which passes through clearance holes 514 in the bases 577 and 529 and 533 of the first and second column sections and the base. Lock nuts 555 secure the end stud 556 to the base 529 of the first column section, i.e., they prevent the stud end 556 (and all of the stud ends) from pulling out of the base 529. The second column section cable 554 passes over a pulley 557 on the top of the second column section 561 and terminates in a block 568 attached to the outside surface of third column section 575, adjacent its base.

Similarly, a third column section cable 560 has a stud end 562 passing through the second and third column section bases 577 and 588 and secured by lock nuts 555 to the base 577. Similar to the other column sections, the third column section cable 560 passes over a pulley 557 on the inside wall of the third column section 575 and terminates in a block 572 attached near the lower end of the fourth column section 587. The fourth column section 587 has no base or end surface and is similar in shape to an octagonal tube.

FIG. 4 being a cross section illustrates two pulley end cable systems for each column section. However, as is shown in FIG. 5, each column section may have four pulley/cable assemblies. Since the forces on the cables decreases from the bottom to the top, the preferred selection is four, three, two cables for these respective sections.

The cables may be terminated in the blocks by passing the cable end through a hole in the block and crimping a sleeve over the cable to prevent it from pulling through the hole in the block. The lock nuts 555 are used for adjusting the preset in the cables and to secure the stud ends of the cables into the bases. Clearance holes are provided through the base of the column support 519 around the lock nuts 555 on the stud ends of the second and third column section cables.

Figure 6A:
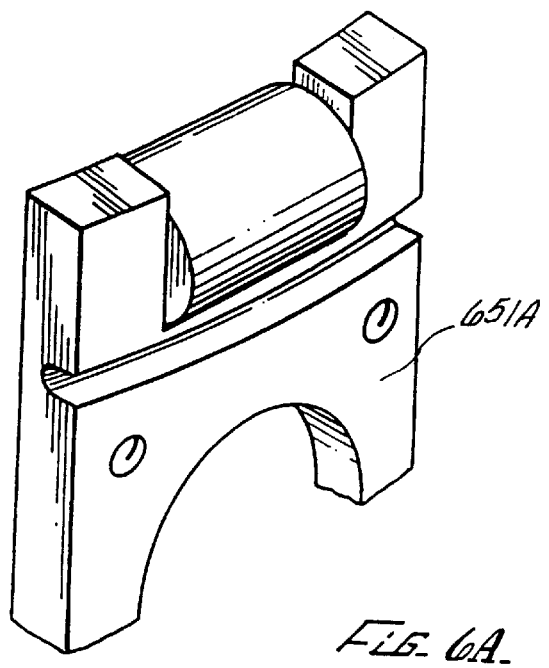
FIG. 6A is a perspective view of another roller block.

Referring to FIG. 5, the column support 519 preferably has eight inner roller channels 525 equally spaced around its circumference, i.e., at 450 intervals. The fourth column section 587 has four outer roller slots 526 coinciding with the lower rollers of FIG. 6, equally spaced around its outside surface with 8 roller slots at the upper end above the pulleys coinciding with the pulleys, as shown in FIGS. 6 and 6A.

The first, second and third column sections 527, 561 and 575 have both inner roller channels 525 and outer roller slots 526 radially aligned with and partially overlying their inner roller channels 525, and also aligned with the roller channels in the column support 519 and fourth column section 587. The inner roller channels 525 may be broached or milled in a scallop shape. Outer slots 526 (which may be broached or milled with a channel cross-section) extend along the length of the four column sections and the column support. Inner channels 525 need only be long enough to accommodate the rollers 653.

Referring to FIGS. 5, 6 and 7, equally spaced between the pulleys 557 are roller blocks 651, i.e. with four roller blocks in between each column section. For improved rigidity, 8 equally spaced roller blocks may be used at the highest stress interface between the column support 519 and the first column section 527. In addition, for each of the other column sections, added rigidity is obtained by roller blocks 651A. These are located near the top edge of the column sections. Thus for all sections the roller supports are at every 450 (8 places) near the top of each column section. The bottom column section has supports at the bottom as well. Each of the others have 4 supports at the bottom. The roller block 651A also prevents it associated pulley from losing its cable in case of slackening.

Each roller block 651 has a body 652 and rollers 653 mounted on a pin 666 between mounting tabs 655. Four threaded roller block mounting holes 657 are provided in the body 652. Adjustment slots 659 are provided at the base of each mounting tab 655, to allow for a small amount of flexing of the tabs 655 for adjustment of the engagement of the rollers 653 during assembly. Each roller block body 652 is radiused on its inner and outer surfaces to match the specific position the roller block will occupy and the column assembly. As shown in FIG. 5, the roller blocks 651 are provided with four different curvatures R. The rollers 653 have an internal bearing which mounts on the pin 666 extending through the mounting tabs 655. A hardened steel strip or runner 661 is secured into the outer roller slots 526 by a single fastener at the top of each of the roller slots. The other or bottom end of the strip 661 is held into the slot 526 (after assembly) by the rollers 653.

Referring now to FIG. 7, the roller blocks 651 are tightly screwed or bolted onto their respective column sections through the threaded mounting holes 657, at the top end of each column section or the column support. The roller block bodies 652 are bolted into position over the slots in the column sections and act as stiffening members. Set screws 663 are then progressively adjusted around the column assembly 500 forcing the mounting tabs 655 to flex slightly inwardly to adjust the rolling engagement of the rollers 653 against the strips 661 in the adjacent section. The rollers 653 roll only on the strip 661. A small gap 665 separates the back of the rollers 653 from the inner roller channels 525. By providing the inner channels 525 and outer slots 526 respectively, relatively large size rollers 653 may be used without requiring an excessively large diameter column assembly. The relatively large size of the rollers 653 provides a quiet and smooth operation as well as a highly rigid column assembly operable in minimal space.

For clarity of illustration, the roller blocks 651 are not shown in FIG. 4, although they are located at the top ends of the column sections in between the rollers, as shown in FIG. 5.

Figure 11:
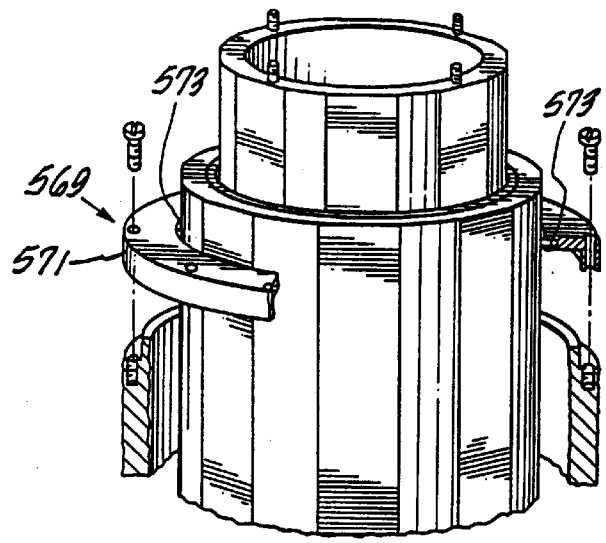
FIG. 11 is a perspective view of a structural shield positioned in between column sections of the pedestal.

Referring to FIG. 11, to increase the stiffness of the column assembly, and to cover over the interstitial openings between the column sections, annular structural shields 569 are provided in between the column sections. A mounting ridge 571 on the structural shields 569 supports and prevents deflection under load of the column sections upper edges. Felt wipers 573 on each structural shield 569 rub very lightly against the strips 661 as the column assembly moves, to keep the strip clean.

Referring to FIGS. 3, 4, 8 and 9, a steering wheel assembly 601 includes a steering frame chassis 603. A steering wheel plate 609 having a vinyl coated steering rim or wheel 252 is attached to an outer bearing race frame 615 and a steering sprocket 607. The steering wheel may be round or ovular. An oval shaped steering allows the camera support to maintain a narrow profile for passing through narrow doorways, etc., but also provides the operator or grip with an increased wheel radius for control and pushing. The plate 609 is attached to the frame chassis 603 through an inner bearing frame section 613 on the frame chassis 603. The steering frame chassis 603 is rigidly attached to the fourth column section 587, and consequently cannot rotate. The steering wheel plate 609 carrying the steering wheel 252 and the steering sprocket 607 is rotatable with respect to the steering frame chassis 603 by virtue of the bearing 620 formed by the outer bearing race frame 615, the inner bearing frame section 613 and balls 617, preferably made from nylon for increased noise reduction in operation. Rather than fill the entire bearing 620 with nylon balls, a combination of teflon spacers and nylon balls may be used.

The spacer in the bearing is preferably a Teflon ball retainer that fits between the races formed by the bearing frames 613 and 615. This reduces the number of balls required in this relatively large diameter bearing and provides good bearing efficiently for handling intermittent fast spin or rotation. The rolling surfaces on frames 613 and 615 are ground polished.

A lower cover plate 604 is attached to the frame chassis 603. Rotatably mounted on the lower cover plate 604 is an idler sprocket 623 (FIG. 8) and a steering drive sprocket 625. A steering drive belt, preferably a Gates Rubber Co. POLY-CHAIN GT toothed belt drivingly loops around and engages the steering sprocket 607, idler sprocket 623 and the steering drive sprocket 625. Accordingly, when the steering wheel 252 is turned, the steering sprocket 607 turns with it and thereby turns the steering drive sprocket 625. The steering sprocket 607 preferably has 112 teeth and may be a Gates 8M 112 sprocket with the steering drive sprocket 625 having 28 teeth, e.g., a Gates 8M 28 sprocket. If the pedestal 101 will be used with the camera dolly 102, the sprockets 607 and 625 must be selected in coordination with the steering system of the dolly, to maintain angular correspondence between movement of the steering wheel 252 and the dolly wheels, i.e., so they rotate the same number of degrees.

Referring specifically to FIG. 9, the telescoping steering drive tube assembly 250 comprises four nested square tube sections 671 (a square bar), 675, 676 and 677 (square tubes) with rubber O-rings provided between the sections. These sections may alternatively be separated by Teflon spacer inserts and have open cell neoprene stops between the sections for damping or other suitable material. The sections 671, 675, 676 and 677 slide in a telescoping manner to follow the vertical movement of the steering wheel assembly 601 as column is raised and lowered. In the embodiment shown in FIG. 9, the four sections of the telescoping steering drive tube assembly 250 do not necessarily extend uniformly or progressively, as do the column sections.

In an alternate embodiment shown in FIG. 12, a cable and pulley system may be used in the telescoping steering drive tube 250 to achieve uniform movement. FIGS. 12, 13, 14 and 15 illustrate an alternate embodiment of the telescoping steering drive tube assembly 205. As shown therein, the drive tube assembly 701 has an inner shaft 703 having pulleys 705 mounted thereto with screws 706 threaded into the inner shaft 703. A cable loop 707 loops around the pulleys 705 and terminates at clamp screw 709, also threaded into the inner shaft 703. Since the lifting forces involved in the telescoping drive tube assembly 701 are on the order of 1.0 lbs., the cable loop 707 may be made of 0.044 inch diameter fishing line with 170 lb. test. An L-shaped mounting tab 711 is secured to the cable loop 707 adjacent the upper pulley 705 and extends through a travel slot 713 in the first tube 715 (FIG. 15). As shown in FIG. 12, the first tube 715 slides over the inner shaft 703. A second tube 717 slides over the first tube 715 and is attached to the mounting tab 711. An access slot 719 is provided at the bottom of the first tube 715 to provide for installation of the clamp screw 709. As is shown in FIGS. 12–15, if the second tube 717 is considered to be fixed in position, and the inner shaft 703 is lifted, it will lift the first tube 715 at one-half the rate of the inner shaft 703. The configuration illustrated in FIGS. 13–15 is repeated for the third and fourth tubes 721 and 723.

Specifically, to accomplish the desired movement between the first tube 715 and the second and third tubes 717 and 721, a similar pulley and cable loop configuration (as is shown on the inner shaft 703 in FIG. 14) is provided on the first tube 715. Correspondingly, the second tube 717 has a travel slot 713 permitting a mounting tab 711 on a cable loop 707 on the first tube 715 to be connected to the third tube 721. Likewise, this configuration is duplicated once again for the fourth tube 723. In each instance, the pulley and loop arrangement is positioned on a different face of the square tubes to avoid excessive build up in width. A total of three cable loop and pulley sets are used. The assembly shown in FIG. 12 causes the tubes forming the steering drive tube assembly 701 to extend and contract uniformly, in the same manner as the column sections in the column assembly. An improved telescoping column is described in my U.S. Pat. No. 5,176,401, which is incorporated herein by reference.

The steering tube drive assembly sections 671, 675, 676 and 677 of FIG. 9 may alternatively be mechanically linked to their corresponding column section which will pull up the steering drive tube section, causing the telescoping steering drive 250 to extend in the same manner as the column assembly. The telescoping steering drive 250 and 701 are constructed to extend and contract smoothly, quietly, and with a minimum of force in order to not disturb the quiet and smooth extension of the column assembly.

Figure 8:
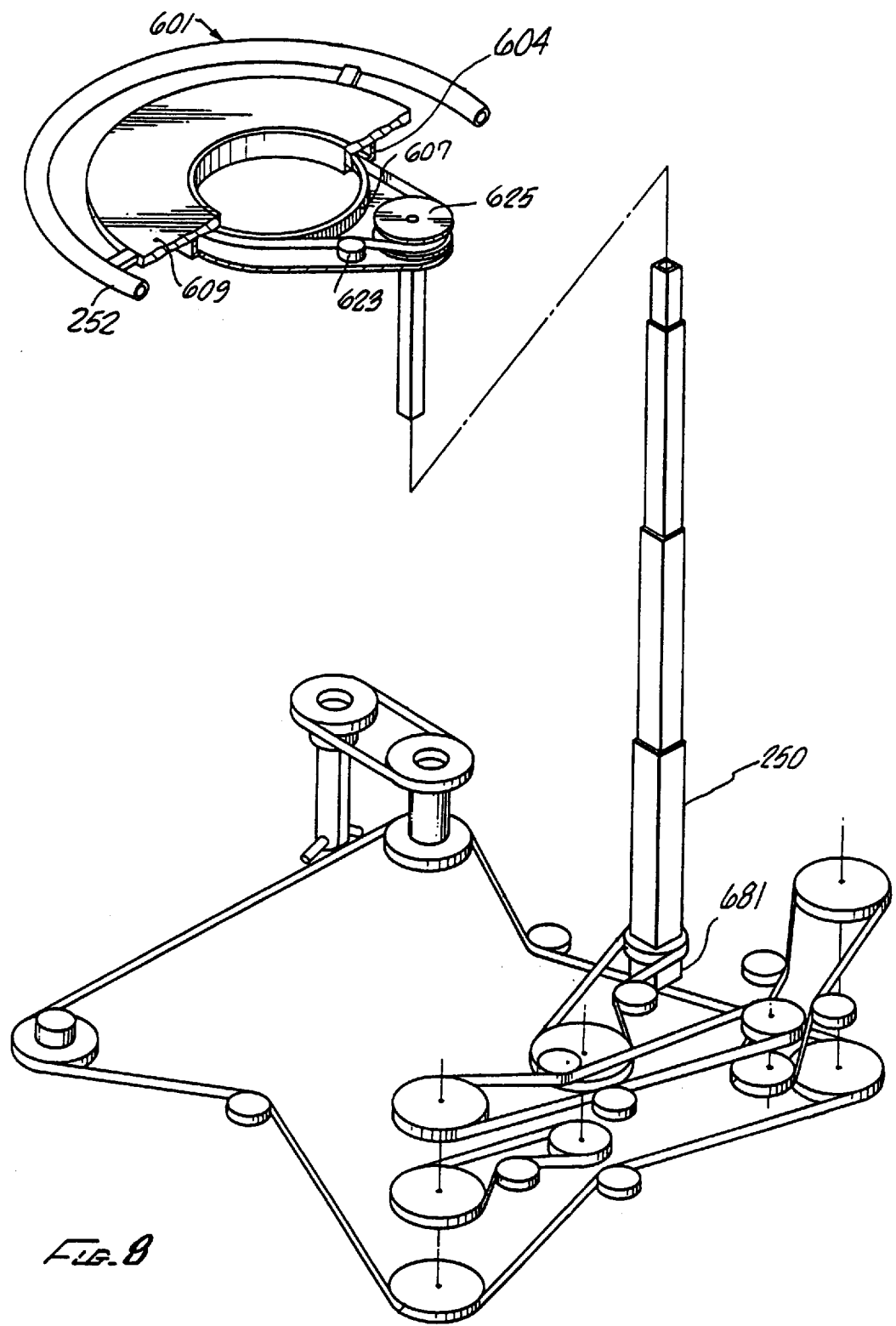
FIG. 8 is a schematic illustration of the steering assembly of the pedestal linked to a dolly steering system.

Turning to FIG. 8, the steering wheel assembly 601 is shown engaged to the steering system of the camera dolly described in my U.S. Pat. No. 5,174,593 and in my U.S. Pat. No. 5,318,313. The base 681 of the steering drive tube 250 extends through and drivably engages a sprocket within the camera dolly, thereby linking the steering assembly 601 of the pedestal to the steering system in the camera dolly. A set screw or similar quick release device secures the inner shaft of the telescoping steering drive tube assembly to the sprocket in the steering wheel assembly 601.

As shown in FIG. 3 a hook assembly 691 is provided on the tank deck. A latch 693 extends downwardly from the lower cover plate 604. With the column assembly fully lowered, the hook engages the spring loaded latch assembly 691 and prevents the column assembly from extending without first releasing the latch assembly 691.

In operation, the camera is attached to the pedestal through the mounting plate 51. Compressed gas, preferably nitrogen, is provided through the delivery tube 511 into the tank volume 506. Sufficient gas is delivered until the pressure acting on the piston 543 causes the column assembly to be urged upwardly with the force counterbalancing the weight of the camera. The column assembly can then be easily raised or lowered, notwithstanding the weight of the camera, by lifting hand action on the steering wheel 252. Additional small weights can be placed on a weight tray 253 (FIG. 3) if desired to aid in counterbalancing. A relief valve 695 prevents overpressurization. A pressure gauge 509 on the tank deck 503 indicates the gas pressure.

Compressed gas is supplied to the tank 506, and it also concurrently flows through the lead tube 511 to the drive chamber 544. Tank 506 and drive chamber 544 are essentially always at the same gas pressure. The gas pressure in the drive chamber exerts a force $F_1$ on the piston 543 cross section. For example, if the gas pressure is 100 p.s.i., and the cross section area of the piston 543 (at the bottom of the stroke as shown in FIG. 4) is 3.974 in$^2$ (i.e., a 2.25 in diameter piston), the force $F_1$=100 p.s.i.×3.974 in$^2$=398 lbs. Neglecting friction and column component weight, this 398 lb. force will counterbalance a camera load weight of 398/4=99 lbs., since the column assembly has a 1:4 drive ratio.

The tank volume 506 is fixed and is connected to the drive chamber 544 i.e. the volume of the drive cylinder 521 below the piston 543. In addition, after the tank volume 506 is charged with compressed gas, the compressed gas source (e.g. a nitrogen bottle) is removed. As the piston 543 is driven upwardly by Force $F_i$, the volume containing the compressed gas increases. Specifically, the volume of the drive chamber 544 increases. Consequently, the gas pressure drops (as determined by the gas laws) as the piston 543 rises. In conventional pedestals this results in a drop in the counterbalancing force from the bottom to the top of the piston stroke. This variable counterbalancing force makes it very difficult to accurately maintain camera position at a given height.

In the present pedestal, drive cylinder 521 tapers outwardly from bottom to top. As the piston 543 rises, the seal 545 expands radially outwardly effectively increasing the cross section area of the piston on which the compressed gas exerts pressure. Hence, towards the top of the drive cylinder 521, the drop in gas pressure is offset by the increase in "piston" surface area to the extent that product of the gas pressure×surface area and the resulting counterbalancing force is substantially constant. Thus the force $F_1$ is substantially constant throughout the stroke. Therefore, the camera remains properly counterbalanced at all elevations of the pedestal and no "drifts" or positioning difficulties are encountered.

As the piston 543 is driven upwardly by the gas pressure, it carries with it the drive rod 548 and the core cylinder 535 which is integral with the entire first column section 527. As this occurs the base 529 of the first column section 527 lifts all of the other column sections 561, 575 and 587. Consequently, the pulleys 547 which are fixed to the column sections move up. The cables 549, 554 and 560 (two on the fourth column section 587, three on the third column section 561, four on the second column section 561) then lift the next inner column section by equal amounts such that the column assembly 500 uniformly extends with all sections moving up by equal relative distance. In absolute terms, the fourth column section 587 extends 4 times the extension of the first column section 527, with the second and third column sections 561 and 575 extending 2 and 3 times thereof, respectively. The tank weldment has an operating maximum pressure of 400 p.s.i. enabling to pedestal the counterbalance up to about 320 lbs.

Since the column support 519 is offset (to the "back") of the tank weldment (FIG. 3), the steering drive sprocket 625 and the steering drive tube 250 can be placed inwardly and away from the steering wheel 252. This allows the operator to grip the steering wheel 252 from various angles or directions without interference from the drive sprocket 625, tube 250 or lower cover plate 604. If the column support 519 were centered in the tank weldment, the drive sprocket 625 would have to be very close the steering wheel 252 and could interfere with the operators grip (for the same size steering wheel).

Figure 10:
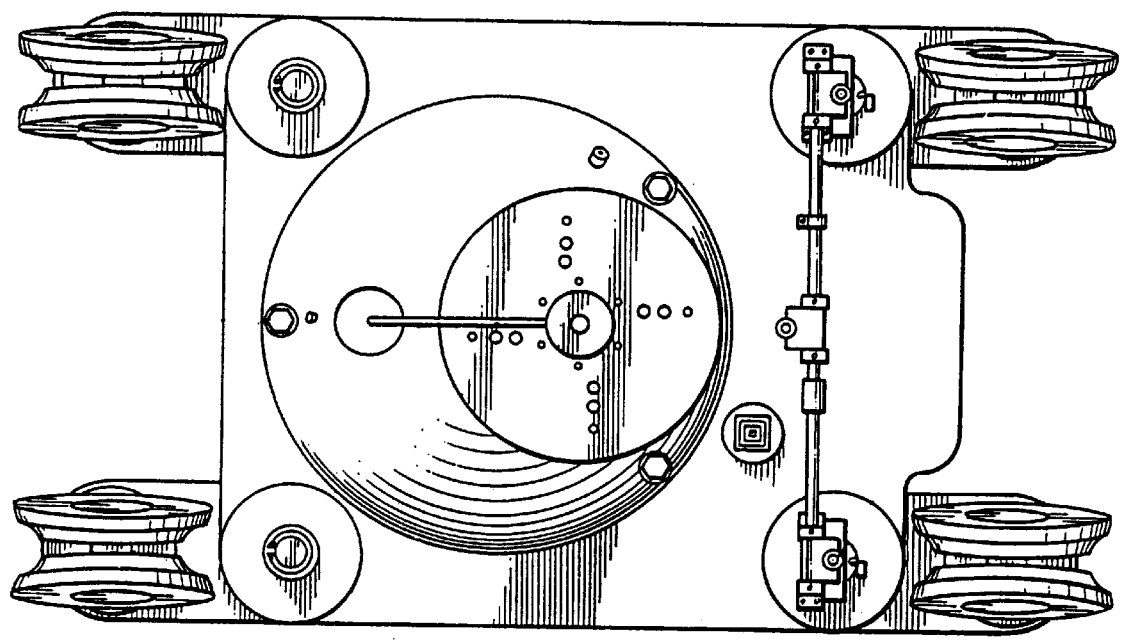
FIG. 10 is a bottom perspective view of the pedestal supported by the dolly.
Figure 16:
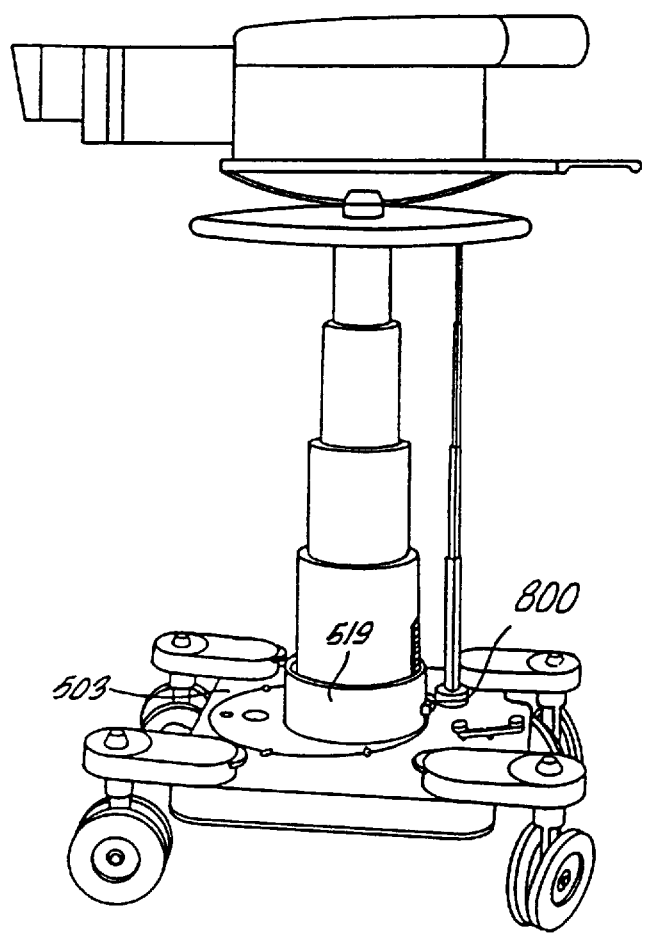
FIG. 16 is a perspective view of the camera dolly with the column in an extended position.

As shown in FIG. 10, for improved flexibility of use, the pressure gauge is within the tank weldment diameter with the tank weldment made purely round without any protrusion. The round tank weldment can then be rotated to different positions on the camera dolly, allowing the pedestal column to be shifted front to back and side to side by twice the eccentricity of the column on the tank weldment. This feature, for example, allows the camera lens to extend further forward of the dolly, without use of any accessory extension plates.

An automatic column assembly 751, as shown in FIG. 17, is similar to the column assembly 103 shown in FIGS. 1–7 and 11, but includes a hydraulic system for automatically and/or remotely elevating the column. The column assembly 751 has a gas cylinder 753 similar to the drive cylinder 521 of FIG. 4. However, the column assembly 751 has a hollow drive rod 755 containing a hydraulic actuator 759. The hydraulic actuator 759 is formed by a hollow hydraulic tube 761 having a central bore 763.

A compact hydraulic unit 783 is preferably provided as a self-contained unit attachable to the underside of the dolly 104. The hydraulic unit 783 is connected to the hydraulic cylinder 761 through a hose 765 and a quick disconnect hydraulic fitting 785 attached to the column. The hydraulic unit 783 includes a three way closed center valve 767 having a control knob 769. The valve 767 is connected to a return tank 771 via a return hose 791, which is also connected to a hand pump 775 or small motor driven pump. An accumulator 779 is connected to the pump by an accumulator hose 795, which also connects to the valve 767. A pressure gauge 807 shows the accumulator pressure. The return tank 771 has a fill cap 773, which may be removed for filling the return tank. A hand lever 777 is used to drive the hand pump 775. Alternatively, the pump may be electrically driven. The piston 543 and seal 545 are attached around the drive rod 755, in the same manner as shown in FIG. 4. A pressure relief safety valve 809 between the accumulator and pump limits the maximum accumulator pressure to a preset pressure. If the preset pressure is exceeded, the safety valve 809 temporarily opens allowing hydraulic fluid to return to the return tank 771.

The pneumatic or compressed gas system of FIG. 17 is the same as shown in FIGS. 1–4, including the compressed gas tank 504 and gas lead tube 511. The gas inlet 757 is offset from the center of the gas cylinder 753, to accommodate the hydraulic actuator 759.

The control valve 767 has three basic positions. In the open position, the control valve 767 connects the accumulator 779 to the hydraulic actuator 759 (specifically through the external hose segment 787, cylinder hose 765 and into the bore 763 in the hydraulic tube 761). In the closed position, the connect segment 787 is entirely closed off, as is the accumulator hose 795, such that there can be no flow through the valve. In the return position, the valve 767 connects the external hose 787 to the return hose 791.

In use, the cylinder hose 765 is filled with hydraulic oil. The connecting end of the cylinder hose 765 is sealed off by the quick disconnect fitting 785. The hydraulic unit 783 is attached to the dolly 104 with a hose segment 787 from the control valve 767 connected to the cylinder hose 765 via the quick disconnect fitting 785.

With the valve in the closed position, the hand pump 775 is operated by movement of the hand lever 777, or the pump is motor driven. This pumping action charges the accumulator 779 with hydraulic fluid 793 under pressure.

With a camera load on the column, the pneumatic or compressed gas system is charged with sufficient gas pressure to counterbalance the load as described above for the embodiment shown in FIGS. 1–5. With the load appropriately balanced, raising or lowering the column requires only that inertial and frictional forces, and a small return or down force be overcome, as the camera load weight is nearly fully compensated. The small down force is selected to achieve the desired maximum down speed.

To automatically raise or extend the column, the valve 767 is turned to the open position. Hydraulic fluid under pressure flows from the accumulator 779 through the accumulator hose 795 and valve 767 into external hose 787 then into the cylinder hose 765 and into the bore 763. The hydraulic fluid fills the bore 763 and pushes on the end surface of the drive rod 755, driving the core cylinder 535 and the column sections upwardly. The seal 793 seals the bore 763 against the inside surface of the hollow drive rod 755. The seal 793 may be located near the top or bottom of the bore 763.

The speed at which the column is raised may be controlled by the amount the valve 767 is opened. The rate of ascent is proportional to the amount the valve is opened. Correspondingly, deceleration of the column may be controlled by the speed and manner in which the valve 767 is once again closed. When the column has reached the desired height, the valve 767 is closed, and the column is hydraulically locked in position.

To lower the column, the valve 767 is placed in the return position, linking the external hose 787 to the return hose 791 leading to the return tank 771. If the compressed gas in the gas cylinder 753 counterbalances the weight of the camera load, there is no net downward force acting to lower or retract the column. Accordingly, to lower the column, additional weight may be applied by e.g., pushing down by hand, thereby forcing the hydraulic fluid out of the hydraulic cylinder 755, through the valve 767 and into the return tank 771. Alternatively, some compressed gas can be released from the gas cylinder 753 when initial settings are made. This removes the counterbalancing compressed gas force and allowing the column to retract under the payload weight. The up force capability of the accumulator 779 is sufficient to overcome this down force with equal or greater net up force.

Because the compressed gas system is used to counterbalance the payload weight, the hydraulic actuator 759 need only overcome inertial and frictional and selected down loading forces. Correspondingly, the hydraulic actuator 759 can be very lightweight and compact. In a preferred embodiment, the piston 761 has a diameter of about 0.37 inches and an extension or travel of about 10 inches, and an accumulator volume of 2 pints. A high pressure (about 3,000 psi) hydraulic system is used to achieve sufficient force acting on the relatively small area of the piston.

For ideal performance, the ratio of the volume $V_1$ of the compressed gas tank 504, to the volume $V_2$ of the compressed gas in gas cylinder 753, should equal the ratio of the volume $V_3$ of the accumulator to the volume $V_4$ of the displacement of the hydraulic cylinder 755.

As the column assembly 103 is hydraulically lifted, hydraulic fluid 793 flows from the accumulator 779 into the hydraulic cylinder 755, causing a decrease in hydraulic pressure as the column extends. For most applications, this pressure loss will be negligible. However, for applications requiring exceptionally precise camera movement, the hydraulic cylinder 755 may be tapered, in the same manner as the gas cylinder 753, so that the effective area of the hydraulic tube 761 increases to offset falling hydraulic pressure, as the hydraulic actuator 759 extends.

The valve 767 may be controlled in a variety of ways. In one embodiment, a simple hand knob 769, extending from the hydraulic unit 783 may be turned by the operator to select the valve position, and the rate and amount of opening or closing. Alternatively, the valve 767 may be controlled by a remote unit adjacent to the steering wheel 252 or in a separate handheld device, linked to the valve by radio, infrared or a control cable. Buttons or switches on the remote control device can then select the desired valve position and rates of valve opening or closing, to thereby control the upward or downward acceleration and velocity of the column, as well as the ending position of the column.

Figure 20:
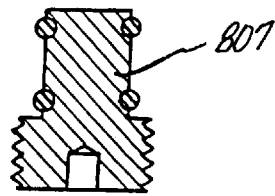
FIGS. 20 is a section view of a sealing plug for sealing the column when the drive system of Fig. is not installed.
Figure 19:
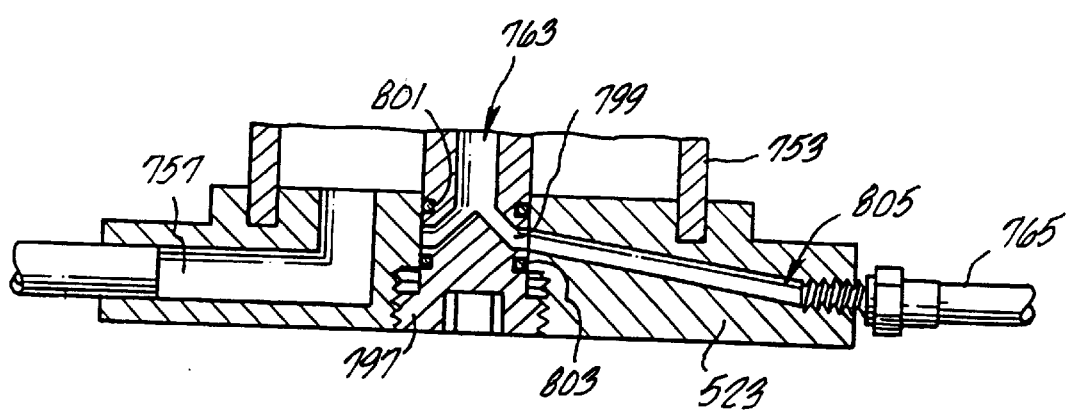
FIG. 19 is a partial section view fragment of an alternative column assembly embodiment adapted to receive the column drive system of FIG. 17.

As shown in FIGS. 17 and 19, the pedestal may be provided with the hollow drive rod 755 which will accommodate the hydraulic tube 761. The hollow drive rod 756 includes a threaded bottom 797. To retrofit the hydraulic drive system onto the pedestal, a sealing plug 807 (threaded into the bottom end cap 523 to seal dirt out of the column), as shown in FIG. 20, is removed and the hydraulic tube 761 is installed, by threading the bottom 797 into the end cap 523. The hydraulic unit 783 is attached as previously described.

The cap 797 has a circumferential groove 799 vertically aligned with the inlet from the cylinder hose 765, so that hydraulic fluid may pass through the plug without the need to radially align the plug and inlet. O-ring 801 seals the pressurized gas in the gas cylinder 753 against the hydraulic tube 761. O-ring 803 seals the plug 797 against the hydraulic fluid.

The number and selection of components, and the dimensions, angles, capacities, etc. described are by way of example only. Of course, various others may be used as well. Thus, while several embodiments have been shown and described, it will be obvious to those skilled in the art that various alterations and additions may be made to the apparatus without deviating from the spirit and scope of the invention.

I claim:

1. A camera pedestal comprising:
   a column support on a pedestal chassis;
   a first column section within the column support and having an inside surface and an outside surface, and a second column section within the first column section and having an inside surface and an outside surface;
   a plurality of spaced apart outer roller slots on the outside surface of the first and second column sections;
   a plurality of spaced apart inner roller channels on the inside surface of the first and second column sections, with the outer roller slots aligned with the inner roller channels;
   a plurality of rollers rotatably attached to roller blocks on the first and second column sections with the rollers protruding into the slots and channels; and set screws associated with said roller blocks for moving the plurality of rollers to engage the first column section.

2. The camera pedestal of claim 1 further comprising a structural shield attached to the column support and surrounding the first column section.

3. A camera pedestal comprising:

a column support on a pedestal chassis;

a first column section within the column support having an inside surface and an outside surface, and a second column section within the first column section having an inside surface and an outside surface;

a plurality of spaced apart outer roller slots on the outside surface of the first and second column sections;

a plurality of spaced apart inner roller channels on the inside surface of the first and second column sections, with the outer roller slots aligned with the inner roller channels;

a plurality of rollers rotatably attached to the first and second column sections with the rollers protruding into the slots and channels;

a pulley rotatably mounted to the first column section; and a cable attached to the first column section, passing over the pulley, and attached to the second column section.

4. A camera pedestal comprising:

a column support on a pedestal chassis;

a first column section within the column support and having an inside surface and an outside surface, and a second column section within the first column section and having an inside surface and an outside surface;

a plurality of spaced apart outer roller slots on the outside surface of the first and second column sections;

a plurality of spaced apart inner roller channels on the inside surface of the first and second column sections, with the outer roller slots aligned with the inner roller channels;

a plurality of rollers rotatably attached to the first and second column sections with the rollers protruding into the slots and channels; and a roller block attached to the inside surface of the first column section, with the rollers mounted on tabs on the roller block.

5. A camera pedestal comprising:

a column support on a pedestal chassis;

a first column section within the column support having an inside surface and an outside surface, and a second column section within the first column section having an inside surface and an outside surface;

a plurality of spaced apart outer roller slots on the outside surface of the first and second column sections;

a plurality of spaced apart inner roller channels on the inside surface of the first and second column sections, with the outer roller slots aligned with the inner roller channels;

a plurality of rollers rotatably attached to the first and second column sections with the rollers protruding into the slots and channels; and roller blocks supporting the rollers, with the roller blocks attached to the inside surface of the first column section.

* * * * *